Oct. 7, 1969
R. M. KIBBY ET AL
3,471,390
ALUMINA CONCENTRATION METER
Filed March 24, 1965
4 Sheets-Sheet 1
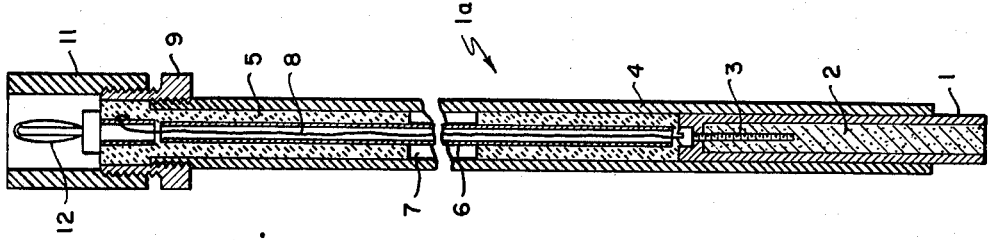
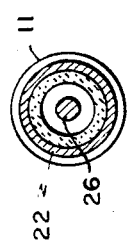
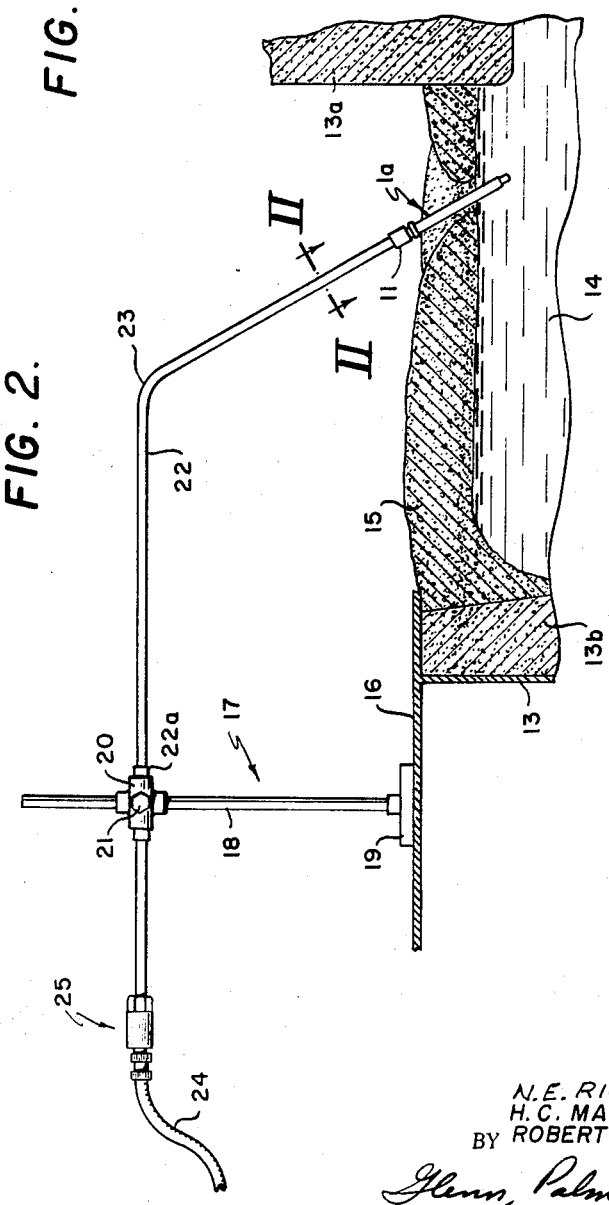
INVENTORS
N. E. RICHARDS
H. C. MARSHALL, JR.
BY ROBERT M. KIBBY
Glenn, Palmer and Matthews
Attorneys

United States Patent Office

3,471,390
Patented Oct. 7, 1969

3,471,390
ALUMINA CONCENTRATION METER
Robert Milton Kibby, Herbert Charles Marshall, Jr., and Nolan Earle Richards, Florence, Ala., assignors to Reynolds Metals Company, Richmond, Va., a corporation of Delaware
Filed Mar. 24, 1965, Ser. No. 442,421
Int. Cl. B01k 3/00; C23b 5/68; C22d 3/12
U.S. Cl. 204—195    13 Claims

ABSTRACT OF THE DISCLOSURE

Apparatus for monitoring bath alumina concentration during the operation of an electrolytic cell. The apparatus includes a power supply connected to an immersible probe having anode and cathode members. Connected between the probe and the power supply is a stepping switch for applying voltage of increasing magnitude to the probe. Means are provided for automatically indicating the alumina concentration of the cell corresponding to the occurrence of an abrupt increase in the resistance between the anode and cathode members of the probe.

---

This invention relates to a system for determining the concentration of ore in a reduction cell or pot. More specifically, although not limited thereto, this invention relates to a method and apparatus for determining the concentration of alumina dissolved in the electrolyte of an aluminum reduction cell.

Aluminum reduction cells or pots traditionally are controlled manually. One of the more important actions required of the operator is to initiate the feeding of alumina to the cell, considerable judgment and background knowledge being a prerequisite. Operating efficiency of the cells depends upon the percent alumina in the electrolyte, which normally ranges between approximately one percent and approximately eight percent.

Industrial cells change their mode of operation when the alumina content falls to approximately one and one-half percent, at which time an "anode effect" occurs. This anode effect requires voltage as much as ten times normal operating voltage to force the pot having the anode effect to pass normal amperage of the potline. In a series of electrolytic cells in which there is a limitation on line voltage, an anode effect on one pot means that the voltage on the remaining pots is decreased and therefore the line current decreases slightly, for example, two percent. If several reduction cells in the line are having anode effects simultaneously, the line amperage can fall to as much as ten percent below normal operating levels. This reduced amperage means that the remaining cells are not producing as much as they would if the amperage were at a level which is possible when there are no anode effects in the line.

Since anode effects mean lost production and higher cost in the reduction plant, it is customary to feed alumina to the cells on such a schedule that anode effects do not occur more often than about one per day per pot. In some cell types it is possible to suppress the anode effect even longer by scheduled feeding of alumina. The closer the operator comes to complete suppression of the anode effect, the closer he comes to overfeeding which results in excessive undissolved alumina in the electrolyte. Eventually, if overfeeding is sustained, the pot becomes "sick," a condition causing a loss of production and excessive heating in the cell.

One method of determining alumina concentration is to take samples of the bath and to run chemical analysis. Disadvantages of this method are that it requires considerable cost and time during which the pot, if close to the lower limit of alumina concentration, may exhibit an anode effect.

It has long been desired by operators engaged in alumina reduction involving the electrolytic process to have an instrument system which would permit the direct and quick determination of the percent alumina dissolved in the cryolite electrolyte.

In contrast with the prior art, the instant invention possesses numerous advantages in that the alumina content of the electrolyte may be continuously monitored, the sensor per se is of simple construction and may be produced at a reasonably small cost, and the system permits quick determination of the percent alumina dissolved in the electrolyte.

The principal object of the invention is to provide a method and means for determining ore concentration in a bath.

Other objects, advantages and details will be apparent from a description of the preferred embodiment shown in the accompanying drawings, in which:

FIGURE 1 shows the probe and holder therefor mounted on an aluminum reduction cell;

FIGURE 2 shows a section of the holder taken along the line II—II on FIGURE 1;

FIGURE 3 shows construction details of the probe;

Figure 4:
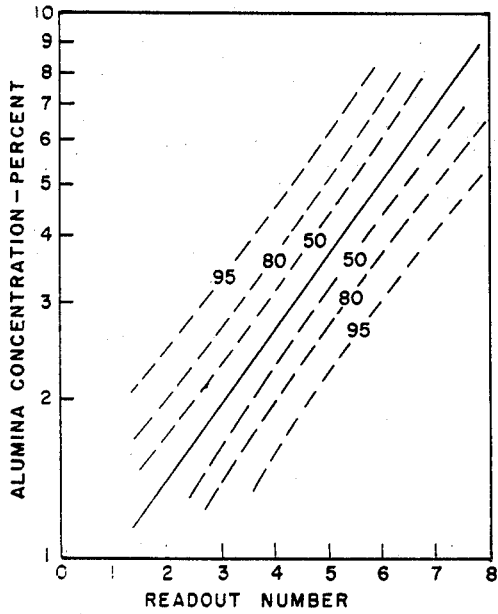
FIGURES 4 to 7 show calibration curves correlating alumina concentration with readout numbers on a meter associated with the probe.
Figure 5:
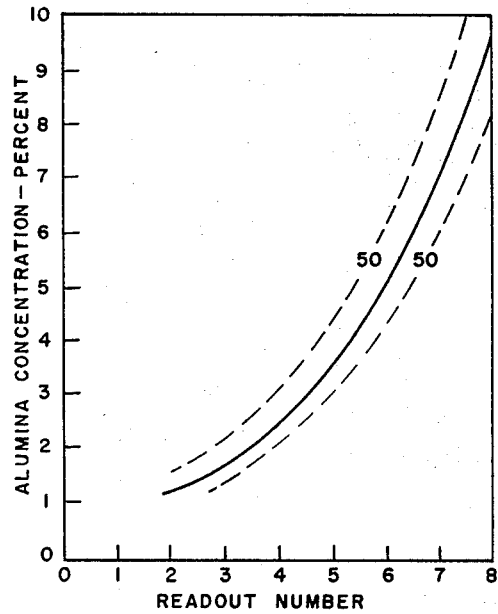
Figure 6:
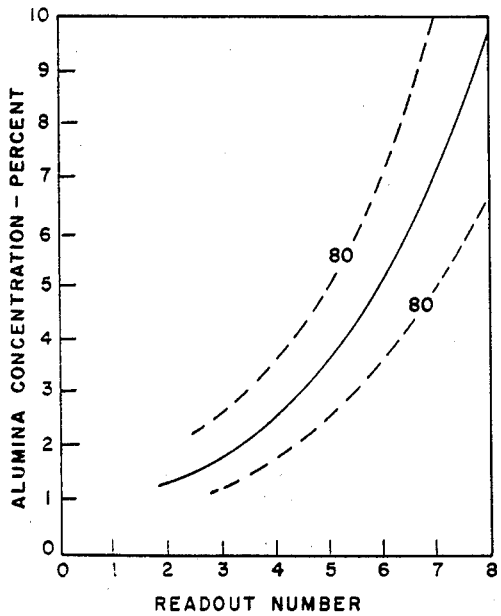
Figure 7:
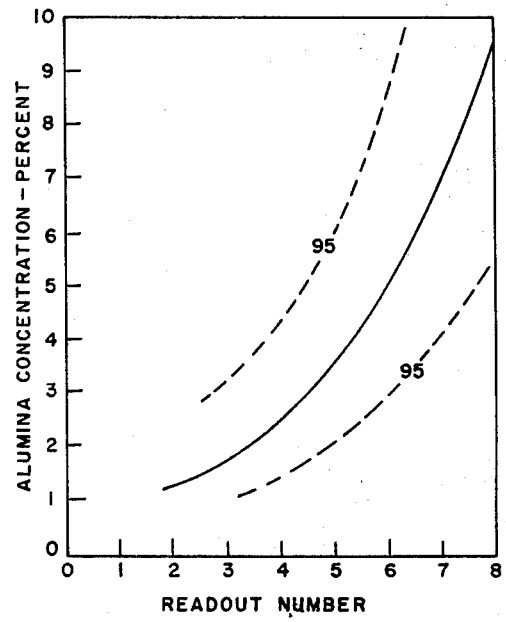

In FIGURE 1 is shown a conventional alumina reduction cell 13 having molten electrolyte 14 with the usual crust 15. The carbon anode and carbon lining are indicated by 13a and 13b, respectively. On an extension or deckplate 16 of the cell 13 rests a probe holder stand 17 comprising a base plate 19 supporting a rigid upright 18 having a cross fitting 20 with thumb screw 21. The cross fitting 20 slidably receives the probe holder 22, which may be one-half inch diameter steel conduit, with a forty-five degree bend at 23. Surrounding the probe holder 22 where it passes through the cross fitting 20 is a glass fiber sleeve 22a for the purpose of insulating the probe holder from the probe holder stand. The probe holder 22 carries a probe element 1a which passes through the crust 15 into the electrolyte 14. As indicated in FIGURE 2 the thin-walled conduit of holder 22 contains an electrical conductor 26 which may be number 18 copper wire, with Teflon insulation. Near the probe end, the Teflon insulation is removed from the wire and replaced with ceramic insulating beads so as to withstand the higher temperatures encountered at this location in the reduction cell. Conductor 26 is thus electrically insulated from probe holder 22.

At the probe end of probe holder 22, the conductor 26 makes electrical connection with a banana jack which in turn connects electrically with the banana plug 12 of the probe (see FIG. 3); and at the other end, connection of the conductor 26 is made to one conductor of a two-conductor neoprene-covered cable 24, with the other conductor being connected to the conduit of holder 22. A strain connector 25 mechanically holds cable 24 with respect to holder 22. Conductor 26 and the steel holder conduit 22 form an electrical circuit as will hereinafter appear. A suitable connector, such as a thinwall conduit box connector, or union, is used on the end of probe holder 22 to make mechanical connection with the probe 1a and also to establish electrical connection with the tubular cathode element 4 through coupling 11.

As detailed in FIGURE 3, the probe 1a includes a graphite anode 2, about one-quarter inch in diameter, which is insulated from an iron pipe 4 (which functions as a cathode) by the insulating outer portion 1 of anode assembly made of a suitable electrical insulating material such as boron nitride. Extending through the top part of the insulator 1 and into the anode 2 is a stainless steel screw 3. At the upper end of the pipe 4 is a bushing 9 further carrying a pipe coupling 11. Centrally within the pipe 4 is located a tubing 6 of refractory insulating material, e.g. fused alumina or alumina beads. A Nichrome wire 8, connected to the banana plug 12, passes through the tubing 6 to the head of screw 3 to which it is connected, for example, by staking or welding. Extending downward from the plug 12 and upward from the top of insulator 1 within the pipe 4 and surrounding the insulating tubing 6 and part of the plug 12 are sections of a castable refractory 5 separated by pulverulent insulating material 7 such as regular metallurgical grade alumina. Insulating material 7 provides an expansion joint. The probe 1a functions as a miniature reduction cell when placed in the electrolyte 14, wherein current flows when voltage is applied by the programmer-meter to be described. Application of an increased voltage to the probe results in a correspondingly increased current flow up to the point where an anode effect occurs, that is, up to a value where resistance of the probe cell increased abruptly. This abrupt change in resistance is detected by the programmer-meter and is employed to indicate the maximum current value. The maximum current that anode 2 in the probe can obtain without the occurrence of such increase in resistance depends primarily on the alumina concentration in the electrolyte and in electrolyte contacting surface area of the anode, and appears also to depend on the time rate of increase of current in approaching this maximum.

The insulator 1 surrounding the graphite anode 2 must be resistant to molten cryolite and easily machined since, during use, the graphite is consumed, requiring that the anode be ground down in such manner as to obtain the desired closely defined area and also so as not to entrap gases. Boron nitride has been found especially suitable for the insulator 1.

While the rate of application of voltage to the probe effects the maximum current, use of a controlled voltage-time relationship in accordance with the invention results in a current-potential relationship which is sufficiently constant for a given probe design to permit calibration against alumina concentration. The voltage-time relationship is selected to produce the sensitivity desired in the calibration. The voltage-time relationship may either be a continuous or a discontinuous one; however, in our present preferred embodiment, it is a discontinuous one wherein steps of voltage of increasing magnitude are impressed across the probe. Since a predetermined time rate of application of voltage is reproducibly applied to the probe, the maximum current that the anode attains (as indicated by the abrupt increase in resistance) may be related to the current directly, or to the voltage or time required to produce this current, or to the wattage dissipated or the energy required. In our presently preferred embodiment, the step number of the voltage level impressed across the probe, at the time of occurrence of an abrupt increase in cell resistance, is used as the programmer-meter readout number.

FIGURES 4 through 7 show calibration curves for the system wherein programmer-meter readout numbers corresponding to voltage levels impressed across the probe at the occurrence of anode effect are correlated to percent alumina concentration as determined by chemical analysis of samples taken from the bath. The method of obtaining these calibration curves will be set forth following a description of the programmer-meter.

Figure 8:
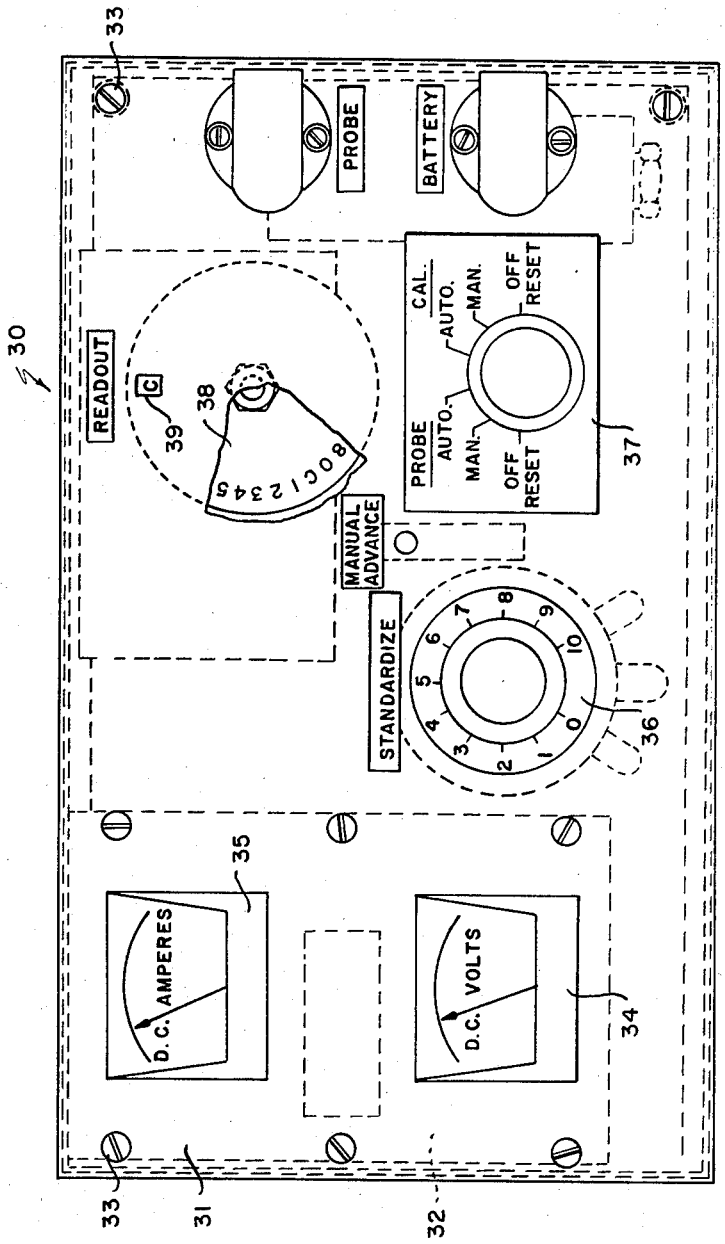
FIGURE 8 shows a utility box housing various components of a programmer-meter.

FIGURE 8 shows various elements of the programmer-meter on a mounting plate 31, fixed by machine screws 33 to the utility box indicated generally by the numeral 30. On the left of the mounting plate is a 0-10 ampere DC ammeter 35 and a 0-10 volt DC voltmeter contained within a steel housing 32. In the center of the plate is a one-ohm fifty-watt rheostat 36 having a knob and a dial to indicate percent resistance in the circuit. On the right of plate 31 is a selector switch 37. The selector switch comprises two gangs, two circuits per gang, with one-to-six positions per circuit, including a knob and dial with 30° indexing. Also on the right of plate 31 is a stepping switch with a readout dial 38 attached to the extended shaft of the switch. The readout dial is read through flat lens 39. The stepping switch consists of 6 levels of 10 points per level with auxiliary interrupter and off-normal contacts.

Figure 9:
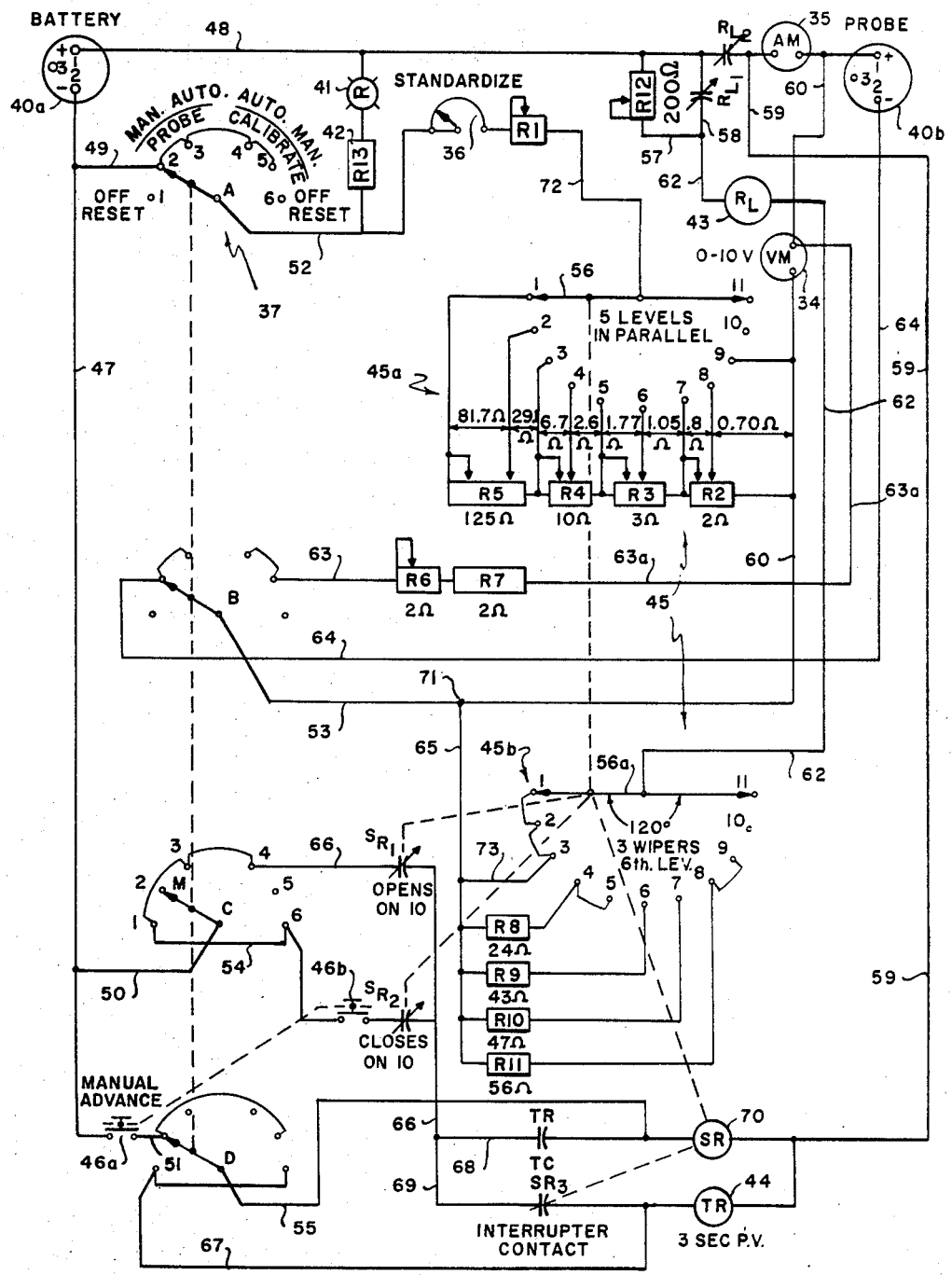
FIGURE 9 shows the circuitry of the programmer-meter to which the probe is connected.

FIGURE 9 shows the circuit of the programmer-meter, including a battery receptacle 40a and a probe receptacle 40b. The selector switch is indicated generally by the numeral 37, with individual wafers at A, B, C, and D. The rotary arms of the wafers are mechanically connected together. Position 2 of each wafer 37A and 37D is connected to the negative conductor 47, whereas position 2 of wafer 37B is connected to the conductor 64. Normally open push button contacts 46a are in the line 51 connected to position 2 of wafer 37D. Push button 46a is mechanically connected to normally open push button 46b in line 54. The stepping switch assembly whose extended wiper shaft is used to attach readout dial 38 consists of stepping switch 45, sections 45a and 45b, stepping relay 70, auxiliary interrupter contacts SR3, auxiliary off normal contacts SR1 and SR2.

The positive side of the battery receptacle 40a connects to the positive side of the probe receptacle 40b through conductor 48, normally closed contacts $R_L2$ of sensing relay 43, and ammeter 35. The probe is connected to the negative side of the battery supply through conductor 64, position 2 or 3 of selector switch 37B, and conductor 53 to the junction 71 of conductor 53 and 65. From this junction point 71 voltmeter 34 is connected across the supply. The probe negative supply may be traced from the negative terminal of 40a through conductor 49, the selector switch 37A, conductor 52, the standardizing rheostat 36, the adjustable resistor R1, conductor 72, certain of the resistors R2-R5 of the program resistors indicated generally by the numeral 45a, conductor 60, to the junction 71 as aforementioned. Resistors R6, R7 connected between conductors 63 and 63a represent a dummy load utilized in calibration as will be hereinafter explained. Relay 43, having normally closed contacts $R_L1$, shunted by adjustable resistor R12, is connected from the positive side of the supply to the rotary arm of the spring-driven stepping switch 45, section 45b by conductor 62 and thence to the negative conductor 65 through the shorted line 73 or through one of the relay bias resistors R8-R11 to the conductor 65 and junction 71.

The relay 43 is set to function at a voltage level dependent on the increment number of the applied voltage, or stepping switch contact position. This voltage level is predetermined and is designed into the system by consideration of the characteristics of the relay selected, the values of the relay bias resistors which are in series with relay 43, and their connections to stepping switch section 45b. Since the circuit comprising relay 43 and its biasing resistors is in parallel with the probe circuit, the voltage drop across both circuits remains equal when the probe is inserted in electrolyte. The occurrence of the abrupt increase in resistance in the probe cell results in a corresponding increased voltage drop across the probe circuit, if the current flow is maintained. This increased voltage drop is correspondingly experienced by the relay circuit and is used to cause the relay to function. Stepping relay 70 having normally closed contacts $SR_1$ and $SR_3$ and normally open contacts $SR_2$ provide the power to actuate section 45b and section 45a of the stepping switch 45. The time delay relay 44 with an approximate delay time of three seconds having normally open contacts TR is effective only during an automatic setting of selector switch 37. Time relay 44 is not utilized when selector switch 37 is set on manual and when the manual advance push button 46a is used to step switch 45 manually. The positive supply for relays 44 and 70 is through conductors 59, contact $R_L2$ and conductor 48. The negative supply for relay 70 is through conductor 55 when selector switch 37 is set on manual, and through contacts TR, conductor 66, contact SR–1, selector switch bank 37–C, and conductor 50 when selector switch 37 is set on automatic. The negative supply for relay 70 is through conductors 55 and 67, contact TC SR–3, conductor 66 when the selector switch 37 is set on "off-reset." Circuit SR–2, 46b, conductors 54 and 50 provide means of restarting the stepping cycle after it has automatically stopped on step 10. The negative supply for relay 44 is through contact TC SR–3 and conductors 69 and 66, when selector switch 37–C is on automatic. Indicator lamp 41 through dropping resistor R13 is across the supply through selector switch 37A and conductor 52. The rheostat 36 is provided between conductors 52 and 72 in the negative supply line to standardize the voltage when the battery supply differs from the normal voltage.

The programmer-meter applies a step increment of increasing voltage to the probe. This is done by use of a time delay relay 44 and a stepping relay 70 actuating sections 45a and 45b of the stepping switch 45. Resistors R2–R5 in series with the probe as program resistors are removed successively as the stepping relay 70 is actuated, or as time increases under the control of time delay relay 44 which is adjusted to give an approximate three second increment step.

Readout of the system is the step or increment number of the voltage which produced the anode effect as indicated on dial 38 through the lens 39. This number is calibrated against percent alumina obtained from laboratory chemical analysis of samples taken from the electrolyte. The programmer-meter senses the occurence of the anode effect, as previously discussed with respect to operation of relay 43, and at this point stops the programmed voltage applied to the probe by the opening of relay contacts $R_L2$.

In operation thirty volts is applied to the programmer-meter by connection to the battery terminal receptacle 40a. A standardization control 36 is provided to permit adjustment for varying battery voltage. A dummy load represented by R6 and R7 is utilized to make this adjustment. The dummy load is further used in checking out the functioning of the complete programmer-meter circuitry as will be afterward described.

Selector switch 37 permits application of programmed voltage to either the probe or the dummy load. Steps of programmed voltage may be applied either manually or automatically. In the manual application a manual advance comprising push button 46a is depressed to select the programmed voltage steps. In the automatic application a time delay relay 44 is used for automatic selection of the programmed voltage steps. In the first case selector switch 37 is turned to "Man."; in the latter case it is turned to "Auto." In the automatic application the manual advance push button 46b must be actuated for the programmed voltages to start. The push button is held down until the first step of stepping switch 45 is attained and is then released.

The method used to insure that proper voltage (voltage standardization) is being applied to the programmer-meter circuits comprises the steps of (1) turning the selector switch 37 to dummy load manual position, "Cal. man."; (2) advancing the stepping relay 70 until a "Readout" of 7 is obtained by successive depression of the "Manual Advance" button 46a; (3) adjusting the "Standardizer" 36 until a reading of 4.5 to 4.6 amperes is obtained on ammeter 35; (4) turning the selector switch 37 to "Off-Reset" position (this advances the program to its beginning point, readout number 0, and cuts the battery power off).

The method of internal circuit checkout comprises the steps of (a) turning the selector switch 37 to the dummy load automatic position "Cal. Auto."; (b) advancing the stepping relay 70 until the first step is heard or until C appears in the readout window 39 (this is done by holding down the "Manual Advance" button until the appearance of C when the button may be released and the programmed voltage steps will continue to be applied to the dummy load; (c) observing the voltmeter 34 and ammeter 35 which will indicate zero after the relay 43 has operated that stops the stepping relay 70 at which time a readout of 8 should be observed; (d) turning the selector switch 37 to "Off-Reset" position which advances the program to its beginning point, readout number 0, and cuts the battery power off.

The method of measuring alumina concentration comprises the steps of (g) placing on the deckplate 16 of the probe holder base plate 19 in a vertical position; (h) preheating the cold probe 1a by gradually lowering the same towards the crust surface until the tip is about 1 to 2 inches away from the crust surface (about 5 minutes); (i) forming a hole in the crust 15 and lowering the probe 1a into the bath to its mid-level or a 2½-inch minimum using the thumb screw 21; (j) waiting for the probe to come to the cell operating temperature (about 10 minutes); (k) standardizing the meter in accordance with steps (1) to (4) set forth supra; (l) performing a functional checkout as set forth in steps (a) to (d) supra; (m) turning the selector switch 37 to the probe automatic position "Probe Auto."; (n) advancing the stepping relay 70 until the first step is heard or until C appears in the readout window 39, the "Manual Advance" button 46a being depressed until the appearance of C then released; (o) observing that the voltmeter and ammeter read zero after the programmed voltage steps automatically stop after the occurrence of an anode effect; (p) recording the value observed in the readout window 39 indicating the step increment when the program stepping relay 70 stops; (q) turning the selector switch 37 to "Off-Reset" which advances the program to its beginning point, or readout 0, and cuts the battery power off.

After two minutes another measurement can be made according to steps (m) through (q). At least three measurements should be made before establishing the "Readout" number to use on the calibration curve (see FIGURES 3–6) corresponding to percent alumina. From the most frequent of the three readings and the calibration curve the approximate percent alumina that the bath contains can be determined. A "Readout" number of 0 indicates that the alumina content exceeds the range of the system.

While present preferred embodiments of the invention have been illustrated and described, it will be apparent that the invention may be otherwise variously embodied and practiced within the scope of the following claims.

What is claimed is:

1. Apparatus for measuring the alumina concentration of an electrolytic bath containing dissolved alumina, comprising: a probe for immersion in the bath, including an anode presenting a predetermined anode area for contact with said bath, a cathode in close proximity to said anode area, and means insulating said cathode from said anode except through the bath; program means for applying voltage of progressively increasing magnitude across said cathode and anode; sensing means for detecting the occurrence of an anode effect indicated by an abrupt increase in the resistance between the anode and cathode of said probe; and means responsive to the detection of said anode effect to stop said program and interrupt the power applied to said probe upon the occurrence of said anode effect.

2. An alumina concentration probe comprising an outer elongated tubular cathode member and an anode member received within said cathode member at one end thereof, with an insulator extending between said members; a tubing element passing from the other end of said cathode member toward the anode member; a conductor in electrical connection with said anode member and passing outwardly through said tubing element; a pair of axially spaced refractory members disposed around said tubing element within the tubular cathode member; and pulverulent insulating material intermediate said refractory members to provide an expansion joint therebetween.

3. An alumina concentration probe according to claim 2 wherein said anode member is composed of graphite, and said insulator is composed of boron nitride.

4. An alumina concentration probe and holder combination comprising a probe having an anode member and a cathode member, a holder including an outer conduit element of electrically conductive material electrically connected to the cathode member of said probe, said probe being supported at one end of said holder, a support for said holder and an electrically insulating member between said holder and said support.

5. An alumina concentration probe and holder combination according to claim 4, further comprising a conductor centrally located within said holder and connected to said anode of the probe.

6. An alumina concentration probe and holder combination comprising a probe having an anode member and a cathode member, a holder, said probe being supported at one end of said holder, a conductor centrally located within said holder and connected to said anode, alumina beads around said conductor adjacent the probe end of said holder, a support for said holder and an electrically insulating member between said holder and said support.

7. An ore concentration monitoring system comprising a probe having anode and cathode members, a power supply, a selector switch and a stepping switch connected between said probe and said power supply for applying voltage of increasing magnitude across said anode and cathode members of the probe, and a stepping relay connected to said stepping switch for actuating the stepping switch.

8. An ore concentration monitoring system according to claim 7 wherein said selector switch includes a manual advance means operable to step said stepping switch.

9. An ore concentration monitoring system according to claim 7 wherein said stepping switch comprises a first section including a plurality of program resistors and a second section including a plurality of relay bias resistors.

10. An ore concentration monitoring system according to claim 9, further comprising a sensing relay connected to said power supply and said probe and to said second section of said stepping switch, said sensing relay being responsive to an abrupt increase in resistance between the anode and cathode members of said probe.

11. An ore concentration monitoring system according to claim 10, further including normally closed relay contacts in the circuit between said power supply and said sensing relay to open the circuit upon the actuation of said sensing relay.

12. An ore concentration monitoring system according to claim 7, further comprising a time delay relay for controlling said stepping relay.

13. An ore concentration monitoring system according to claim 7, further comprising a readout dial operated by said stepping switch for indicating ore concentration.

References Cited

UNITED STATES PATENTS

| | | | |
|---|---|---|---|
| 2,208,023 | 7/1940 | Ellis | 204—195 |
| 2,773,020 | 12/1956 | Offutt et al. | 204—195 |
| 2,933,440 | 4/1960 | Greenfield | 204—67 |
| 3,067,384 | 12/1962 | Sorg | 204—195 |
| 3,317,413 | 5/1967 | Chambran | 204—245 |
| 3,329,592 | 7/1967 | Uhrenholdt | 204—243 |

ROBERT K. MIHALEK, Primary Examiner

T. TUNG, Assistant Examiner

U.S. Cl. X.R.

204—1, 67, 245, 286, 297